(12) United States Patent
Cooper et al.

(10) Patent No.: US 11,124,211 B2
(45) Date of Patent: Sep. 21, 2021

(54) METHODS AND DEVICES FOR LOCATING A RAILWAY VEHICLE

(71) Applicant: ALSTROM Transport Technologies, Saint-Ouen (FR)

(72) Inventors: Jared Cooper, Melbourne, FL (US); Nicholas Nagrodsky, Melbourne, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 424 days.

(21) Appl. No.: 16/213,034

(22) Filed: Dec. 7, 2018

(65) Prior Publication Data
US 2020/0180669 A1    Jun. 11, 2020

(51) Int. Cl.
| | |
|---|---|
| *B61L 25/02* | (2006.01) |
| *B61L 27/00* | (2006.01) |
| *G10L 25/51* | (2013.01) |
| *G06F 16/683* | (2019.01) |

(52) U.S. Cl.
CPC ......... *B61L 25/025* (2013.01); *B61L 27/0077* (2013.01); *G06F 16/683* (2019.01); *G10L 25/51* (2013.01)

(58) Field of Classification Search
CPC .. B61L 25/025; B61L 27/0077; G06F 16/683; G10L 25/51
See application file for complete search history.

(56) References Cited

U.S. PATENT DOCUMENTS

| | | | | |
|---|---|---|---|---|
| 2003/0010872 | A1* | 1/2003 | Lewin | B61L 23/041 246/122 R |
| 2012/0097803 | A1* | 4/2012 | Daum | B61L 3/04 246/184 |
| 2012/0217351 | A1* | 8/2012 | Chadwick | B61L 1/06 246/169 R |
| 2016/0202302 | A1* | 7/2016 | Cooper | G01R 31/086 324/503 |
| 2016/0334543 | A1* | 11/2016 | Nagrodsky | B61L 1/06 |
| 2018/0156757 | A1* | 6/2018 | Nagrodsky | G01M 11/30 |
| 2018/0257685 | A1* | 9/2018 | Nagrodsky | B61L 25/025 |
| 2018/0340801 | A1* | 11/2018 | Kelley | G01H 9/004 |
| 2018/0354534 | A1* | 12/2018 | Cole | B61L 23/041 |
| 2019/0232988 | A1* | 8/2019 | Lang | B61L 25/025 |
| 2019/0232990 | A1* | 8/2019 | Moennich | B61L 23/042 |
| 2020/0172130 | A1* | 6/2020 | Esprey | G01H 9/006 |
| 2020/0180669 | A1* | 6/2020 | Cooper | B61L 27/0077 |

FOREIGN PATENT DOCUMENTS

WO    WO 2013/114135    8/2013

\* cited by examiner

*Primary Examiner* — Jason C Smith
(74) *Attorney, Agent, or Firm* — Nixon & Vanderhye

(57) ABSTRACT

A method for locating a railway vehicle includes: measuring an acoustic signature of a railway vehicle passing over a railway switch for switching between a first railway track and a second railway track diverging from the first railway track, using a distributed acoustic sensing apparatus including an optical fiber sensor placed along the railway switch; analyzing the measured acoustic signature, using an electronic processing unit, by identifying, in the measured acoustic signature, vibration patterns representative of track geometry and/or track curvature; and determining which of the first railway track or the second railway track is occupied by the railway vehicle, using the electronic processing unit, based on the identified vibration patterns.

6 Claims, 3 Drawing Sheets

METHODS AND DEVICES FOR LOCATING A RAILWAY VEHICLE

TECHNICAL FIELD

The present disclosure relates to methods and devices for locating a railway vehicle in a railway network.

BACKGROUND

Many known railway signaling devices and methods are used for detecting the position of a railway vehicle moving on a railway track. Some of those are based on distributed acoustic sensing (DAS) technologies, for example as described in international application WO 2013/114135 A2, using optical fiber cables buried along a railway track and acting as acoustic sensors to measure the acoustic signature of a moving railway vehicle.

However, devices and methods based on distributed acoustic sensing usually fail to achieve an accurate detection of a railway vehicle in multi-track environments, i.e. in places where two or more railway tracks are arranged close to each other. One reason is that known optical fiber-based acoustic sensors do not have sufficient lateral resolution for determining precisely which one of the multiple tracks is occupied by the railway vehicle.

SUMMARY

Embodiments of the invention at least partially address the above issues by providing methods and devices for locating a railway vehicle in multi-track environments.

Aspects of the invention relate to a method for locating a railway vehicle, comprising:
  measuring an acoustic signature of a railway vehicle passing over a railway switch using a distributed acoustic sensing apparatus including an optical fiber sensor placed along the railway switch, the railway switch being connected, on one side, to a first section of a first railway track and, on the other side, to a second section of the first railway track and to a second railway track, the railway switch being configured for switching between a first position, wherein it links rails of the first section and of the second section and a second position, wherein it links rails of the first section and of the second railway track, the second railway track diverging from the first railway track,
  analyzing the measured acoustic signature, using an electronic processing unit, by identifying, in the measured acoustic signature, vibration patterns representative of track geometry and/or track curvature,
  determining a track occupancy information, representative of which of the first railway track or the second railway track is occupied by the railway vehicle, using the electronic processing unit, based on the identified vibration patterns.

In one or more embodiments, the method further includes recording the determined track occupancy information into a machine-readable storage medium.

In one or more embodiments, identifying vibration patterns includes detecting a vibration pattern representative of the railway vehicle going along a curved track portion of the switch leading to the diverging second railway track, the railway vehicle being then determined as occupying the second railway track.

In one or more embodiments, detecting said representative vibration pattern comprises identifying a first portion of the acoustic signature in which signal amplitude values are associated to a signal amplitude level higher than the signal amplitude level of a second portion of the acoustic signature, said first portion including:
  first and second sub-regions each associated to a first signal frequency value, and
  a third sub-region between the first and second sub-regions, said third sub-region being associated to a second signal frequency value lower than the first signal frequency value.

In one or more embodiments, identifying vibrations patterns comprises comparing, using the electronic processing unit, at least a portion of the measured acoustic signature with predetermined reference data.

According to another aspect, embodiments relate to a device for locating a railway vehicle, comprising:
  a distributed acoustic sensing apparatus including an optical fiber sensor placed along a railway switch, the railway switch being connected, on one side, to a first section of a first railway track and, on the other side, to a second section of the first railway track and to a second railway track, the railway switch being configured for switching between a first position, wherein it links rails of the first section and of the second section and a second position, wherein it links rails of the first section and of the second railway track, the second railway track diverging from the first railway track,
  an electronic processing unit having an input connected to the distributed acoustic sensing apparatus,
  wherein the electronic processing unit is configured for:
  receiving an acoustic signature measured by the distributed acoustic sensing apparatus, the acoustic signature having been measured during the passage of a railway vehicle over the railway switch,
  analyzing the measured acoustic signature by identifying, in the measured acoustic signature, vibration patterns representative of track geometry and/or track curvature,
  determining a track occupancy information, representative of which of the first railway track or the second railway track is occupied by the railway vehicle, based on the identified vibration patterns.

In one or more embodiments, the electronic processing unit is configured for recording the determined track occupancy information into a machine-readable storage medium.

In one or more embodiments, identifying vibration patterns includes detecting a vibration pattern representative of the railway vehicle going along a curved track portion of the switch leading to the diverging second railway track, the railway vehicle being then determined as occupying the second railway track.

In one or more embodiments, identifying vibrations patterns comprises comparing, using the electronic processing unit, at least a portion of the measured acoustic signature with predetermined reference data.

BRIEF DESCRIPTION OF THE DRAWINGS

The invention will be better understood upon reading the following description of some embodiments, provided solely as a non-limiting example, and made in reference to the appended drawings, in which.

DETAILED DESCRIPTION OF SOME EMBODIMENTS

Figure 1:
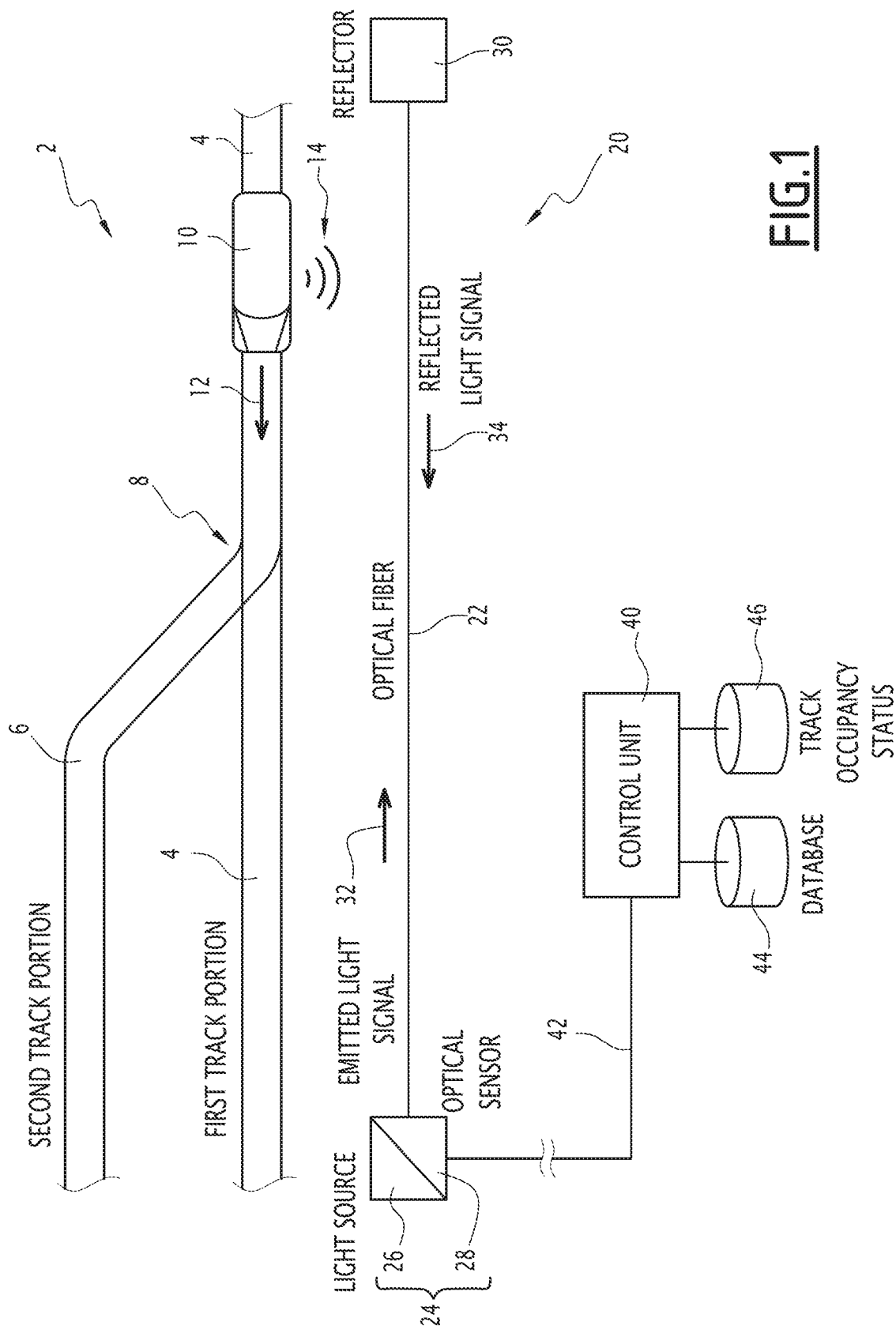
FIG. 1 is a simplified diagram of a railway installation including a device for detecting the location of a railway vehicle in a railway network according to some embodiments.

In FIG. 1 there is illustrated a railway network 2 including a first railway track portion 4, a second railway track portion 6 diverging from the first railway track portion 4 and a railway switch 8 connecting the second railway track 6 to the first railway track 4.

In some embodiments, the first track 4 and the second track 6 are arranged close to each other, e.g. separated from each other by less than 10 meters or by less than 5 meters.

That portion of the railway network 2 is therefore said to constitute a multi-track environment, in the sense that it includes at least two railway tracks arranged close to each other. Examples of multi-track environments include, but are not limited to, freight yards, railway stations, railway junctions, maintenance yards and rolling stock depots.

In the illustrated example, the first track 4 and the second track 6 lie substantially parallel to each other beyond the railway switch 8. The second track portion 6 includes a curved portion or diverging portion connected directly to the railway switch 8.

In the illustrated example, a railway vehicle 10 is running on the first track 4, ahead of the railway switch 8, in a forward direction illustrated by arrow 12. The railway vehicle 10 can, at this stage, either remain on the first track 4 or switch towards the second track 6.

Reference 14 denotes a propagation pattern of acoustic vibrations generated by the railway vehicle 10 as it moves over railway tracks. For example, acoustic vibrations 14 arise from the mechanical interaction between the wheels of railway vehicle 10 and the railway tracks.

A device 20 for determining the location of a railway vehicle is associated to the railway network 2.

The device 20 comprises a distributed acoustic sensing (DAS) apparatus including at least one optical fiber sensor 22 placed along railway switch 8.

For example, the device 20 is adapted to measure the acoustic signature generated by the railway vehicle 10 (corresponding to the vibrations 14), using the DAS apparatus, and to automatically determine the location of the railway vehicle 10 using the data measured by the DAS apparatus.

The device 20 is more specifically adapted to automatically determine the path taken by the railway vehicle 10 after passing the railway switch 8, i.e. to determine whether the railway vehicle 10 remains on the first track 4 or whether the railway vehicle 10 bifurcates towards the second track 6.

In one or more embodiments, the DAS apparatus includes an optical transducer device 24 coupled to the optical fiber sensor 22 and including a light source 26 and an optical sensor 28.

For example, the optical fiber sensor 22 includes an optical fiber cable arranged along the railway switch 8, preferably laid or buried lengthwise along the railway switch 8.

Preferably, the optical fiber sensor 22 also extends partially on each side of the railway switch 8 along the first and second tracks 4 and 6.

According to examples, the length of the optical fiber sensor 22 is lower than 20 meters or lower than 10 meters.

In some embodiments, the optical transducer device 24 is connected at one end of the optical fiber cable and an optical reflector 30 is connected at the opposite end of the optical fiber cable.

In some other embodiments, the reflector 30 may be removed and the optical sensor 28 may be dissociated from the optical transducer device 24 and be installed in place of the reflector 30, at the opposite end of the optical fiber cable.

According to examples, the light source 26 may include a solid-state controllable light source, such as a light-emitting diode (LED) element or a laser diode or any equivalent device. The optical sensor 28 may include a solid-state detector such as a photodiode or a charge-coupled device (CCD) sensor module or any equivalent device. The optical reflector 30 may include Bragg fiber gratings or a dielectric mirror element or any equivalent device.

In practice, the light source 26 emits optical light signals 32, such as pulsed light signals, with predetermined optical properties (such as, but not necessarily limited to: frequency, bandwidth, pulse length, waveform shape, etc.) Emitted light signals 32 are injected into the optical fiber 22 and propagate towards the reflector 30. Reflected light signals 34 propagate back inside the optical fiber 22 towards the optical sensor 28. Upon receiving reflected light signals 34, the optical sensor 28 generates measurement signals (e.g. analog or digital signals) representative of optical properties of the detected reflected light signals 34.

Because of the proximity between the optical fiber sensor 22 and the railway tracks 4, 6 and switch 8, the vibrations 14 generated by the railway vehicle 10 change the optical properties of the light signals 32, 34 propagating inside the optical fiber sensor 22. This change of optical properties can be measured and quantified by the device 20 and correspond to an acoustic signature of the railway vehicle 10 during its passage along the optical fiber sensor 22. The position of the railway vehicle 10 is then automatically inferred from the acquired acoustic signature.

For example, the device 20 may determine the position of the railway vehicle 10 relative to the light source 24 and may also determine which of the first and second tracks 4, 6 is occupied by the railway vehicle 10.

To that end, the device 20 includes an electronic control and processing unit 40 configured to determine the location of the railway vehicle 10 from the acquired acoustic signature.

The electronic control unit 40 is connected to an output of the optical transducer device 24, e.g. using a wired link 42, such as a cable.

According to examples, the control unit 40 may include an electronic circuit, such as purpose-built circuitry, or a digital signal processor (DSP), or a programmable logic element. The control unit 40 may also include a central processing unit (CPU), such as a microprocessor or a programmable microcontroller, and a computer memory storing machine-readable executable instructions able to be executed by the CPU.

In the illustrated example, the control unit 40 is connected to a machine-readable data storage device 44, such as dedicated memory unit or an appropriate data structure (such as a database) residing in a computer memory of control unit 40.

In some embodiments, the control unit 40 may also be used to control the optical transducer device 24, e.g. for controlling the emission of the optical signals.

According to one or more embodiments, the control unit 40 is operatively coupled to a machine-readable data storage medium 46 for recording the track occupancy status of the first and second tracks 4 and 6, e.g. for storing the location of the railway vehicle 10.

According to some embodiments, the control unit 40 may be part of a railway supervision system or an interlocking facility. The storage medium 46 may be implemented using a computer memory. According to other examples, the control center and/or the storage medium 46 include wired electrical circuits and electromechanical devices (such as relays). The track occupancy status may be recorded into the storage medium 46 by setting one or several relays in a specific, predefined state.

Figure 2:
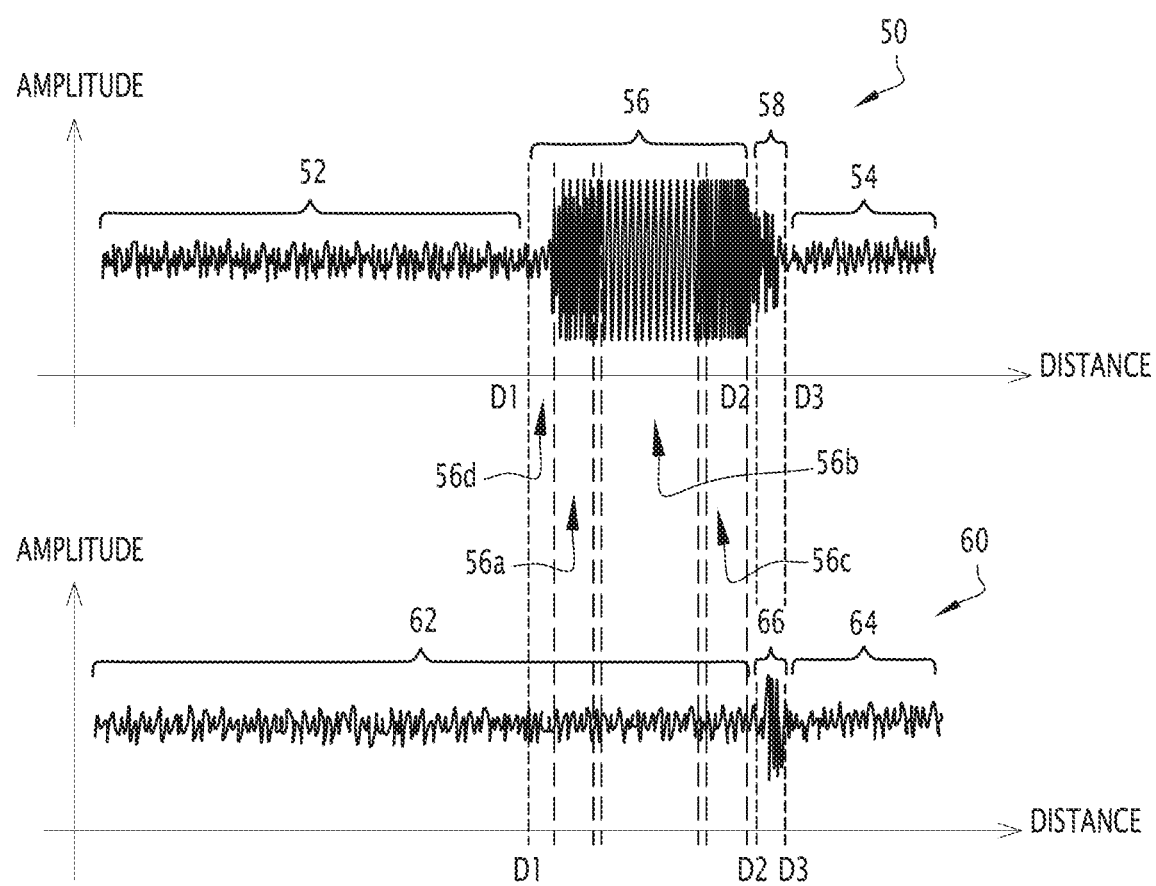
FIG. 2 is an example of two acoustic signatures measured using the device of FIG. 1 and corresponding to railway vehicles following different paths on the railway network.

Turning now to FIG. 2, there is illustrated, for explanatory purposes, a first graph 50 representing a first acoustic signature and a second graph 60 representing a second acoustic signature, both being acquired with the device 20.

For example, the first acoustic signature 50 is measured when the railway vehicle 10 turns towards the second track 6 on a curved track portion when going through the switch 8, and the second acoustic signature 60 is measured when the railway vehicle 10 remains on the first track 4 after going through the switch 8. In other words, the first acoustic signature 50 is representative of a vibration pattern representative of the railway vehicle going along the curved track portion of the switch leading to the diverging second railway track 6 and the second acoustic signature 60 is representative of a vibration pattern representative of the railway vehicle going/remaining along the first track while it is going through the switch.

In this example, the acoustic signatures are expressed as amplitude (e.g. amplitude of the mechanical vibrations 14 or amplitude of the modifications of a measurable property of the optical signal) as a function of a distance. For example, the distance is measured along the length of the optical sensor 22 (which sensibly corresponds to a length along the first railway 4 associated to the device 20). The distance may be expressed relative to the position of the light source 26, i.e. it expresses the distance between the vehicle and the light source. In practice, the acoustic signature values can be expressed as amplitude versus time, the correspondence between the measurement time and the distance depending on the speed of the vehicle 2.

References D1, D2 and D3 denote distances values associated to specific positions of the railway portions 4, 6 and switch 8.

Figure 3:
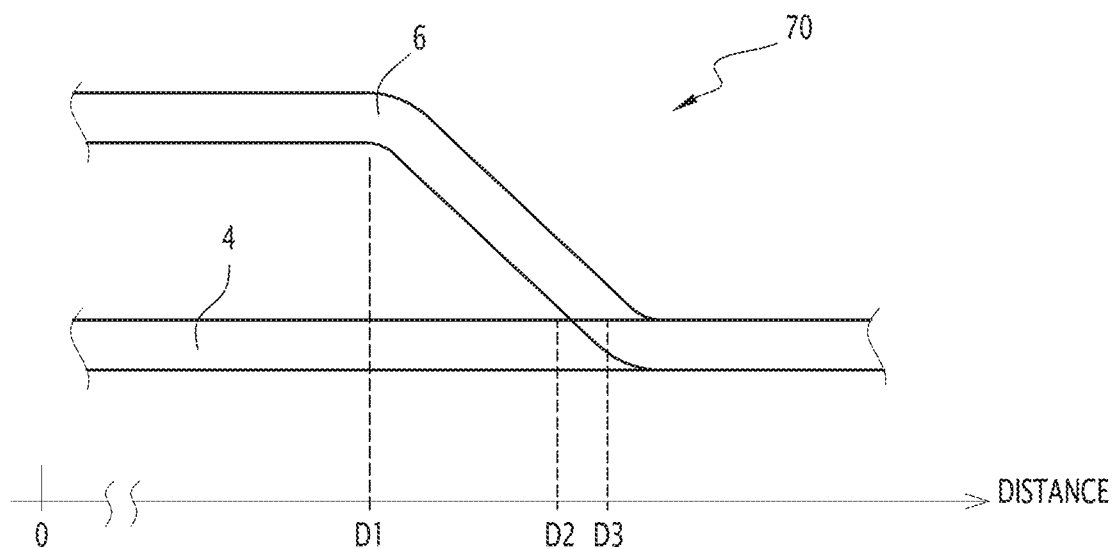
FIG. 3 is a simplified diagram of the exemplary railway portion of FIG. 1.

For example, as illustrated in the diagram 70 of FIG. 3, points D1 and D2 delimit a first range of positions corresponding to a curved rail portion connecting the straight portion of the second railway 6 to the first railway 4. Points D2 and D3 delimit a second range of positions corresponding to the location of a frog point of railway switch 8.

In the illustrated example, the first acoustic signature 50 comprises several contiguous signal portions 52, 54, 56 and 58.

According to examples, signal portions 52 and 54 are similar and form a baseline of the acoustic signature 50, corresponding to vibrations generated by the railway vehicle 10 as it moves in along straight track portions. For example, acoustic signal values in signal portions 52 and 54 are associated to a first amplitude level (e.g. an average maximum amplitude value).

Portion 58 is delimited by positions D2 and D3 and includes vibrations of increased amplitude resulting from the jump of the wheels of vehicle 10 over the frog point when going through the switch 8. For example, acoustic signal values signal portion 58 are associated to a second amplitude level, said second amplitude level being higher than the first amplitude level.

Portion 56 is delimited by positions D1 and D2 and includes vibrations resulting from the increased effort and vibrations exerted by the wheels of the vehicle 10 when the latter is turning along the curved rail portion of the switch 8 towards the second track 6. For example, acoustic signal values in signal portion 56 are associated to a third amplitude level, said third amplitude level being higher than the second amplitude level. For example, portion 56 is longer than portion 58.

In the illustrated example, the corresponding vibration pattern in signal portion 56 includes:

first and second sub-regions 56a and 56c each associated to a first signal frequency value (e.g. an average frequency of the measured signal), and a third sub-region 56b between sub-regions 56a and 56d, said third sub-region 56b being associated to a second signal frequency value lower than the first signal frequency value.

Signal portion 56 may further include an additional sub-region 56d contiguous with signal portion 52, the signal in said additional sub-region 56d being similar to the baseline of the acoustic signature 50 of signal portion 52.

In the illustrated example, the second acoustic signature 60 comprises contiguous signal portions 62, 64 and 66. Portions 62 and 64 are similar to portions 52 and 54, while portion 66 is similar to portion 58. However, the second acoustic signature 60 is devoid from vibration patterns analogous to portion 56, since in that example the vehicle 10 does not take any turns when crossing the switch 8.

Figure 4:
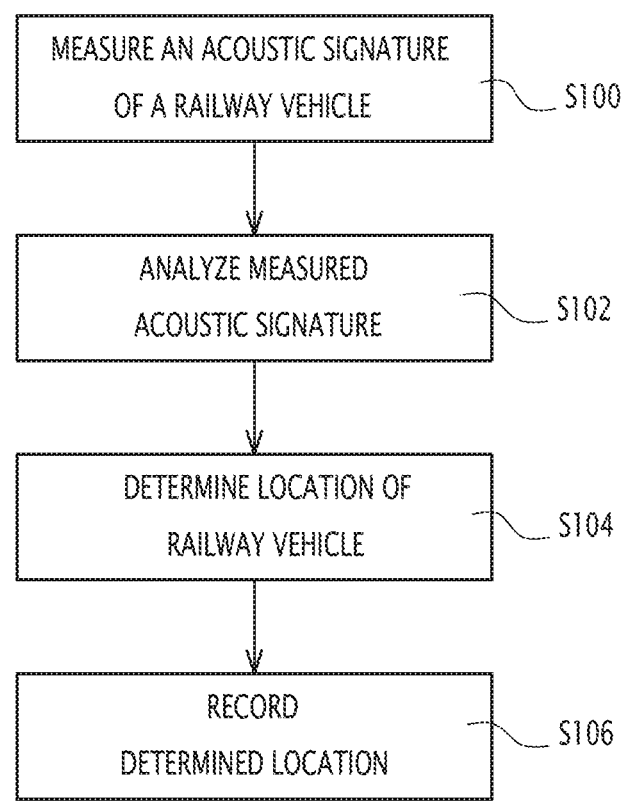
FIG. 4 is a flow chart illustrating a method for detecting the location of the railway vehicle according to some embodiments using the device of FIG. 1.

An exemplary mode of operation is now described in reference to FIG. 4.

At block S100, an acoustic signature of the railway vehicle 10 passing over the railway switch 8 is acquired using the distributed acoustic sensing apparatus of device 20.

The acquired acoustic signature may, for example, be stored in a working memory of the control unit 40.

At block S102, the measured acoustic signature is automatically analyzed, using the control unit 40, by identifying, in the measured acoustic signature, vibration patterns representative of track geometry and/or track curvature, such as a vibration pattern representative of the railway vehicle 10 going along a curved track portion of the switch 8 leading to the diverging second railway 6.

If such a vibration pattern is identified, then the railway vehicle 10 is determined as occupying the second track 6. If no such vibration pattern is identified, then the railway vehicle 10 is assumed to remain on the first track 4.

According to some embodiments, identifying vibrations patterns may comprise comparing, using the processing unit 40, at least a portion of the measured acoustic signature with predetermined reference data.

The portion of acoustic signature may correspond to a subset of signal values associated to a specific distance range measured along the optical sensor 22.

For example, a first portion of the acoustic signature may correspond to the position of the curved rail portion, such as the signal portion 56 of the example of FIG. 2.

According to another example, a second portion of the measured acoustic signature may correspond to the location of the frog point of the railway switch 8, such as the signal portions 58 or 66 of the examples of FIG. 2.

In other words, in such embodiments, the identification may be performed using the acoustic signal values associated to one or several portions of the measured acoustic signature but not necessarily using the whole acoustic signature.

The vibration patterns representative of track geometry and/or track curvature may be identified using signal features extracted from the acquired signature such as amplitude values, frequency values, statistical values, etc.

For example, the signal amplitude in a region associated to the curved rail portion (i.e. the distance range between D1 and D2) may be averaged and compared with a reference threshold value to determine whether the vibrations generated by the vehicle 10 are indicative of the vehicle 10 turning along the curved rail portion.

For example, said reference data may be retrieved from storage 44.

According to some examples, the reference data may be calculated beforehand on the basis of geometrical and/or structural properties of the railway switch 8 such as the curvature radius of the curved portion, the declivity, the dimensional properties of the rails, gap length of the frog, and the like.

According to some embodiments, the reference data may be computed from other portions of the same signal in addition to the at least said one portion, said other portions being associated to a different geometry of the railway switch 8. For example, the averaged signal amplitude in the region between distances D1 and D2 is compared with averaged signal amplitude values outside that range of distances.

The examples above can be applied using signal amplitude values and/or using other signal features such as frequency, signal shape, and the like. The identification may be performed directly using said signal values, as described above, or on computed values derived from the signal (e.g. a Fourier transform of the acquired acoustic signature).

According to examples, detecting said representative vibration pattern comprises identifying the portion 56 of the acquired acoustic signature.

At block S104, the control unit 40 automatically determines track occupancy information representative of which of the first track 4 or the second track 6 is occupied by the railway vehicle 10, based on the vibration patterns identified at S102.

Optionally, at block S106, the determined track occupancy information is automatically recorded into storage medium 50.

In the embodiments mentioned above, associating the device 20 to the switch 8 allows to determine which track is occupied by the railway vehicle 10 when the vehicle enters a portion of the network 2 having multiple tracks arranged close to each other.

This information can be used to supplement the railway location information usually measured with DAS devices (such as the position along the length of the rail), for example by reading automatically the track occupancy information obtained using the device 20 as described above.

In embodiments where the network 2 includes several switches 8 for connecting multiple railway tracks in a multiple track environment, then a device similar to the device 20 can be associated to each switch 8 in order to keep track of the railway vehicle 10 in the network 2.

The embodiments and alternatives described above may be combined with each other in order to generate new embodiments.

The invention claimed is:

1. A method for locating a railway vehicle, comprising:
    measuring an acoustic signature of a railway vehicle passing over a railway switch, using a distributed acoustic sensing apparatus including an optical fiber sensor placed along the railway switch, the railway switch being connected, on one side, to a first section of a first railway track and, on the other side, to a second section of the first railway track and to a second railway track, the railway switch being configured for switching between a first position, in which rails of the first section and rails of the second section are linked, and a second position, in which the rails of the first section and rails of the second railway track are linked, the second railway track diverging from the first railway track;
    analyzing the measured acoustic signature, using an electronic processing unit, by identifying, in the measured acoustic signature, vibration patterns representative of track geometry and/or track curvature; and
    determining a track occupancy information, representative of which of the first railway track or the second railway track is occupied by the railway vehicle, using the electronic processing unit, based on the identified vibration patterns,
    wherein said identifying vibration patterns comprises detecting a vibration pattern representative of the railway vehicle going along a curved track portion of the switch leading to the diverging second railway track, the railway vehicle being then determined as occupying the second railway track, and
    wherein said detecting comprises identifying a first portion of the acoustic signature in which signal amplitude values are associated to a signal amplitude level higher than the signal amplitude level of a second portion of the acoustic signature, said first portion including:
        first and second sub-regions each associated to a first signal frequency value, and
        a third sub-region between the first and second sub-regions, said third sub-region being associated to a second signal frequency value lower than the first signal frequency value.

2. The method of claim 1, wherein the method further comprises:
    recording the determined track occupancy information into a machine-readable storage medium.

3. The method of claim 1, wherein said identifying vibrations patterns further comprises comparing, using the electronic processing unit, at least a portion of the measured acoustic signature with predetermined reference data.

4. A device for locating a railway vehicle, comprising:
    a distributed acoustic sensing apparatus including an optical fiber sensor placed along a railway switch, the railway switch being connected, on one side, to a first section of a first railway track and, on the other side, to a second section of the first railway track and to a second railway track, the railway switch being configured for switching between a first position, in which rails of the first section and rails of the second section are linked, and a second position, in which the rails of the first section and rails of the second railway track are linked, the second railway track diverging from the first railway track; and an electronic processing unit having an input connected to the distributed acoustic sensing apparatus, wherein the electronic processing unit is configured for:

receiving an acoustic signature measured by the distributed acoustic sensing apparatus, the acoustic signature having been measured during the passage of a railway vehicle over the railway switch, analyzing the measured acoustic signature by identifying, in the measured acoustic signature, vibration patterns representative of track geometry and/or track curvature, determining a track occupancy information, representative of which of the first railway track or the second railway track is occupied by the railway vehicle, based on the identified vibration patterns, wherein said identifying vibration patterns comprises detecting a vibration pattern representative of the railway vehicle going along a curved track portion of the switch leading to the diverging second railway track, the railway vehicle being then determined as occupying the second railway track, and wherein said detecting comprises identifying a first portion of the acoustic signature in which signal amplitude values are associated to a signal amplitude level higher than the signal amplitude level of a second portion of the acoustic signature, said first portion including:

first and second sub-regions each associated to a first signal frequency value, and a third sub-region between the first and second sub-regions, said third sub-region being associated to a second signal frequency value lower than the first signal frequency value.

5. The device of claim 4, wherein the electronic processing unit is further configured for recording the determined track occupancy information into a machine-readable storage medium.

6. The device of claim 4, wherein said identifying vibrations patterns further comprises comparing, using the electronic processing unit, at least a portion of the measured acoustic signature with predetermined reference data.

\* \* \* \* \*